United States Patent
Themelis

(10) Patent No.: US 8,416,414 B2
(45) Date of Patent: Apr. 9, 2013

(54) SYSTEMS AND METHODS FOR MULTISPECTRAL IMAGING

(76) Inventor: George Themelis, Crete (GR)

(*) Notice: Subject to any disclaimer, the term of this patent is extended or adjusted under 35 U.S.C. 154(b) by 0 days.

(21) Appl. No.: 13/296,889

(22) Filed: Nov. 15, 2011

(65) Prior Publication Data
US 2012/0085932 A1   Apr. 12, 2012

Related U.S. Application Data

(63) Continuation of application No. 12/092,670, filed as application No. PCT/US2006/042886 on Nov. 2, 2006, now Pat. No. 8,081,311.

(60) Provisional application No. 60/733,364, filed on Nov. 4, 2005.

(51) Int. Cl.
*G01N 21/25* (2006.01)

(52) U.S. Cl. ......... 356/419; 348/49; 348/745; 348/760; 356/411; 356/432; 359/629; 359/637

(58) Field of Classification Search ......... 356/411–432; 359/629–637; 348/49, 745, 778, 760, 63, 348/769, 272, 336, 338, 262, 342
See application file for complete search history.

(56) References Cited

U.S. PATENT DOCUMENTS 4,093,375 A * 6/1978 Griesch et al. ............... 356/443
7,612,822 B2 * 11/2009 Ajito et al. ................... 348/338

* cited by examiner

*Primary Examiner* — Gregory J Toatley
*Assistant Examiner* — Iyabo S Alli
(74) *Attorney, Agent, or Firm* — Quarles & Brady, LLP

(57) ABSTRACT

A system (10) for multispectral imaging includes a first optical filter (24, 20) having at least two passbands disposed in different spatial positions on the first optical filter, a second optical filter (20, 24) having another at least two passbands, and processor (32) adapted to identify an intensity of light in the at least two passband of the second optical filter.

6 Claims, 14 Drawing Sheets

SYSTEMS AND METHODS FOR MULTISPECTRAL IMAGING

CROSS REFERENCE TO RELATED APPLICATIONS

The present patent application is a continuation of U.S. patent application Ser. No. 12/092,670 filed May 5, 2008 now U.S. Pat. No. 8,081,311 and entitled "SYSTEM FOR MULTISPECTRAL IMAGING" which represents the national stage application of International Application PCT/US2006/042886, filed Nov. 2, 2006, and which claims the benefit of U.S. Provisional Patent Application 60/733,364 filed Nov. 4, 2005, which are incorporated herein by reference in their entirety for all purposes.

FIELD OF THE INVENTION

This invention relates generally to systems and methods for multispectral imaging and, more particularly, to systems and methods that can provide a relatively large number of simultaneous spectral images.

BACKGROUND OF THE INVENTION

Spectral imaging is a form of imaging in which a defined band of electromagnetic energy is used to generate an image of an object. The image is referred to as a spectral image. Multispectral imaging is a technique in which multiple bands of electromagnetic energy are used to generate multiple images of an object. That is, each band of electromagnetic energy generates a corresponding one of the multiple images. The multiple images are also referred to as spectral images. Some forms of multispectral imaging use very narrow passbands to form the resulting spectral images in which a corresponding small range of light wavelength can be discerned.

There are two fundamental types of conventional multispectral imaging. A "scanning" type of multispectral imaging scans an object in wavelength and/or in space to provide the plurality images. The conventional scanning type of multispectral imaging requires a substantial time to generate the plurality of images, and therefore, is not suitable for all applications, for example, applications in which the object is moving. A "simultaneous acquisition" type of multispectral imaging is able to generate the plurality of images simultaneously or nearly simultaneously. The conventional simultaneous acquisition type of multispectral imaging can generate the plurality of spectral images quickly, however, is only able to generate a relatively small number of spectral images.

With respect to the scanning type of mutispectral imaging, there exist a variety of sub-types, for example, spectral scanning, spatial scanning, spectral-spatial scanning, interferometric scanning, and light source spectrum scanning. Each of these sub-types requires a substantial amount of time to generate a plurality of spectral images.

Spectral scanning uses a plurality of narrowband optical filters positioned one at a time between an object and a light detector. By selectively changing the optical filter and associated transmission wavelength, spectral scanning generates one spectral image at a time.

Spatial scanning uses a line scan, for which a line of the line scan includes information at a plurality of wavelengths. The line scan is spatially scanned across the object to generate a plurality of spectral images.

Spectro-spatial scanning uses a linear variable interference filter (LVIF). An LVIF is an optical band bass filter having a central wavelength that changes along one spatial dimension. Like the above spectral scanning, by selectively scanning the LVIF and associated transmission wavelength, spectro-spatial scanning can generate one spectral image at a time.

Interferometric scanning uses a Fourier transform spectrometer in a Twyman-Green arrangement, in which a mirror is moved to scan an object. After completion of the scanning and acquisition, resulting data is analyzed (inverse Fourier transformed) to generate a plurality of spectral images.

Light source spectrum scanning uses a light source having a selectively variable output wavelength to illuminate an object. Like the above spectral scanning, by selectively changing (i.e., scanning) the light source transmission and/or emission wavelength, light source spectrum scanning can generate one spectral image at a time.

With respect to the simultaneous acquisition type of multispectral imaging, there also exist a variety of sub-types, for example, a multiple parallel camera type, an image cloning type, a dispersed optics type, a multiple microfilter type, and an unconventional CCD type. Each of these sub-types is able to generate only a relatively small number of spectral images.

Multiple parallel camera multispectral imaging uses a plurality of cameras to simultaneously generate spectral images of an object. Each one of the cameras captures an image at a different wavelength. However, because the cameras have a relatively large physical extent, they are unable to capture exactly the same perspective of the object, and therefore, lack image registration. Also, each one of the cameras, having a different lens, must be separately focused. The number of spectral images is limited by the number of cameras.

Image cloning multispectral imaging uses an optical assembly (e.g., a plurality of prisms) to split an image from an object into a plurality of image clones. Each one of the image clones can be passed through a separate optical filter prior to detection. This technique is used in many conventional CCD cameras. Existing conventional arrangements include systems that direct all of the image clones onto separate portions of a single CCD and systems that direct the image clones onto separate CCDs. The image can be split into the image clones by sets of prisms, mirrors, beam splitters, or focusing mirrors. Each image has an intensity less than the original image intensity (i.e., it is degraded), in inverse proportion to the number of image clones generated. The number of spectral images that can be generated is limited by the number image clones.

Dispersed optics multispectral imaging passes light received from the object through a grating in order to form several spatially distorted and overlapping spectral images on a light detector. This type has poor imaging resolution.

Multiple microfilter multispectral imaging uses sets of micro-filters arranged in a so-called color filter proximate to a CCD array in order to measure colors. The color filter usually has a combination of three or four different broadband micofilters arranged in a grid pattern. Each pixel of the CCD array is covered by one of the relatively broad bandpass micofilters. Each one of the broad bandpass micofilters passes light having a color corresponding to the respective microfilter. The combination of three or four different broadband microfilters spread out in a grid pattern proximate to the CCD array can simultaneously capture a plurality of colors at every part of the image. However, the number of spectral images is limited by the number of different microfilters in the color filter. Also, because the spectral bands of the microfilters in the color filter tend to be relatively broad, the wavelength selectivity of a resulting spectral image is limited.

Conventional color CCDs used in multiple microfilter multispectral imaging are used in conjunction with either a cyan-magenta-yellow-green (CMYG) or a red-green-blue (RGB)

set of microfilters arranged in the above-described grid pattern to form a color optical filter. For example, a CMYG CCD has groups of four adjacent pixels covered with different microfilters and all four pixels measure essentially the same spatial point on an object but in different spectral bands. As used herein, the CCD is referred to separately from the associated color optical filter, though they tend to be joined into a common assembly in a conventional color CCD.

Unconventional CCD multispectral imaging uses a type of CCD having CCD pixels at different depths in a substrate. The different depths form bandpass filters (i.e., microfilters) with respective spectral bands (i.e., central wavelengths) related to their depths. This arrangement is similar to the above-described multiple microfilter multispectral imaging, but the microfilters are formed by the depths. The number of spectral images is limited by the number of different depths. Also, because the spectral bands corresponding to the depths tend to be relatively broad, the wavelength selectivity of a resulting spectral image is limited.

SUMMARY OF THE INVENTION

The multispectral imaging system and technique described herein provide simultaneous or nearly simultaneous acquisition of a plurality of spectral images, each associated with a different spectral band. In some embodiments, the present invention uses a combination of a multiple-bandpass optical filter, for example, a quadruple bandpass filter (QBPF) and a color optical filter, for example a cyan, magenta, yellow green (CMYG) filter. In some other embodiments, the present invention uses a combination of a polychroic mirror and a color optical filter.

In accordance with the present invention, apparatus for multispectral imaging includes a first optical filter having at least two passbands disposed in different spatial positions on the first optical filter and a second optical filter disposed in optical communication with the first optical filter. The second optical filter also has at least two passbands. The apparatus also includes a processor adapted to identify an intensity of light in one or more of the at least two passbands of the second optical filter.

In accordance with another aspect of the present invention, apparatus for multispectral imaging includes an optical structure adapted to receive light and to split the light into a plurality of light paths, each light path adapted to pass a respective portion of the light. The apparatus also includes a plurality of first optical filters, wherein a respective one of the plurality of first optical filters is disposed in each one of the light paths. Each one of the first optical filters has at least two passbands disposed in different spatial positions on the first optical filter. The apparatus still further includes a plurality of second optical filters. A respective one of the second optical filters is disposed in each one of the light paths. Each one of the second optical filters is disposed in optical communication with a respective one of the first optical filters. Some of the second optical filters have different passbands. The apparatus still further includes a processor adapted to identify an intensity of the light in one or more of the different passbands of two of the second optical filters.

In accordance with yet another aspect of the present invention, a method of multispectral imaging includes receiving light, passing the light through a first optical filter having at least two passbands disposed in different spatial positions on the first optical filter, and passing the light through a second optical filter. The second optical filter also has at least two passbands. The method also includes processing to identify an intensity of the light in one or more of the at least two passbands of the second optical filter.

In accordance with yet another aspect of the present invention, a method of multispectral imaging includes receiving light with an optical structure adapted to split the light into a plurality of light paths. Each light path is adapted to pass a respective portion of the light. The method also includes passing the portions of the light through a plurality of first optical filters. One of the first optical filters is disposed in each one of the light paths. Each one of the first optical filters has at least two passbands disposed in different spatial positions on the first optical filter. The method further includes passing the portions of the light through a plurality of second optical filters. One of the second optical filters is disposed in each one of the light paths. Each one of the second optical filters is disposed in optical communication with a respective one of the first optical filters. Some of the second optical filters have different passbands. The method still further includes processing to identify an intensity of the light in one or more of the different at least two passbands of each of a respective two of the second optical filters.

In accordance with yet another aspect of the present invention, apparatus for multispectral imaging includes a multispectral light source adapted to transmit light toward an object. The light is multispectral light having a plurality of discrete passbands. The apparatus for multispectral imaging also includes a multispectral imaging system adapted to receive reflected light from the object in accordance with the transmitted light. The reflected light has the plurality of discrete passbands. The multispectral imaging system includes a processor adapted to identify an intensity of light in one or more of the discrete passbands.

In accordance with yet another aspect of the present invention, a method of multispectral imaging includes transmitting light toward an object, wherein the light is multispectral light having a plurality of discrete passbands. The method further includes receiving reflected light from the object in accordance with the transmitted light, wherein the reflected light has the plurality of discrete passbands. The method still further includes processing the reflected light to identify an intensity of the reflected light in one or more of the discrete passbands.

In accordance with yet another aspect of the present invention, apparatus for multispectral imaging includes a light source adapted to transmit light toward an object, wherein the light source is adapted to excite emission of fluorescent light from the object. The apparatus further includes a multispectral imaging system adapted to receive the fluorescent light. The multispectral imaging system includes a processor adapted to identify an intensity of the fluorescent light in one or more discrete passbands. In some embodiments, the multispectral imaging system is further adapted to receive reflected light from the object in accordance with the transmitted light, and the processor is further adapted to identify an intensity of the reflected light in another different one or more discrete passbands.

In accordance with yet another aspect of the present invention, a method of multispectral imaging includes transmitting light toward an object, wherein the light is adapted to excite emission of fluorescent light from the object. The method further includes receiving the fluorescent light from the object, and processing the fluorescent light to identify an intensity of the fluorescent light in one or more discrete passbands. In some embodiments, the method also includes receiving reflected light from the object in accordance with the transmitted light, and processing the reflected light to identify an intensity of the reflected light in another different one or more discrete passbands.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
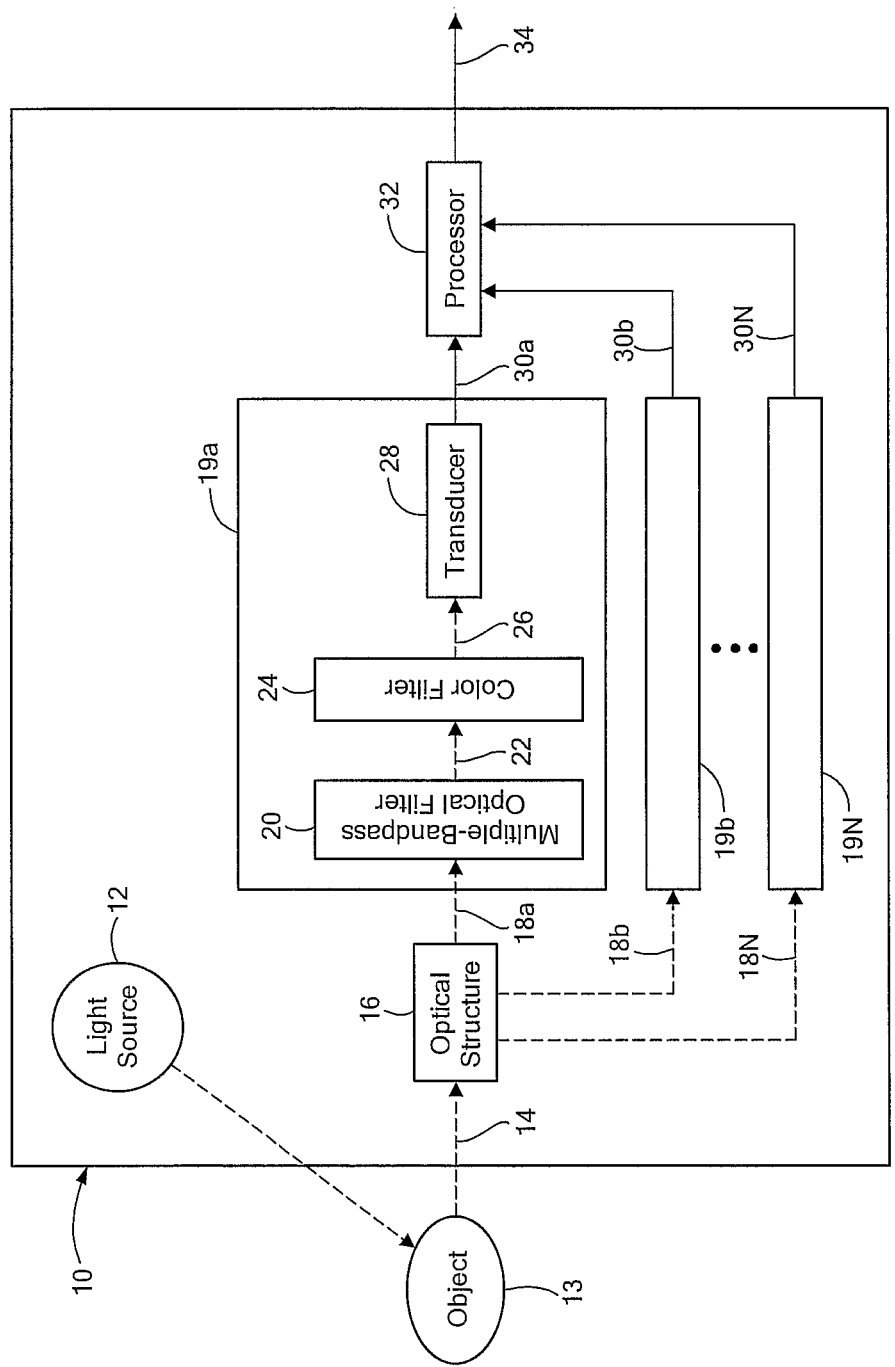
FIG. 1 is a block diagram showing a multispectral imaging system.

Before describing the present invention, some introductory concepts and terminology are explained. As used herein the term "spectral image" is used to describe an image formed in a defined bandwidth of the electromagnetic spectrum.

As used herein, the term "color optical filter" is used to describe an optical component having a surface on which a plurality of different "microfilters" (having different passbands) is disposed. The plurality of microfilters is arranged in segments. Each segment can have the same group of microfilters, and each segment can be arranged in a grid pattern about the surface. Generally, each microfilter and associated passband is in optical communication with one pixel of a CCD array. One conventional type of color optical filter has a plurality of segments, each segment with cyan, yellow, magenta, and green (CMYG) microfilters and associated passbands. Another conventional type of color optical filter has a plurality of segments, each segment with red, blue, and green (RGB) microfilters and associated passbands. Yet another conventional type of color optical filter has a plurality of segments, each segment with red, blue, green, and emerald (RGBE) microfilters and associated passbands. However, the color optical filter can have segments with two or more microfilters and associated passbands. The color optical filter is described more fully below in conjunction with FIG. 2.

As used herein, the term "multiple-bandpass optical filter" is used to describe an optical component adapted to pass light only in distinct narrow passbands. For example, one type of multiple-bandpass optical filter, a quadruple bandpass filter (QBPF), has four passbands, each with a bandwidth of about 25 nanometers. Another conventional type of multiple-bandpass optical filter, a triple bandpass filter (TBPF), has three passbands, each with a bandwidth of about 25 nanometers. However, the multiple-bandpass optical filter can have two or more passbands and other bandwidths. The passbands of the multiple-bandpass optical filter are usually narrower than the passband of the color optical filter. Also, the passband of the multiple-bandpass optical filter are not associated with microfilters. Rather each of the passbands of the multiple-bandpass optical filter is continuously distributed about the multiple-bandpass optical filter: The multiple-bandpass optical filter is described more fully below in conjunction with FIGS. 1, 3, 3A, 4 and 4A.

As used herein, the term "polychroic mirror" is used to describe an optical component adapted to reflect light only in distinct narrow passbands and to pass the remaining light. For example, one type of polychroic mirror has four passbands, each with a bandwidth of about 25 nanometers.

As used herein, the term "optical filter" is used to refer to any optical element adapted to separate light into separate optical bands. Optical filters include, but are not limited to, the above-described color optical filters, multiple-bandpass optical filters, and polychroic mirrors. Optical filters can also include optical gratings.

Referring to FIG. 1, a multispectral imaging system 10 includes an optical structure 16. The system 10 also includes a plurality of optical assemblies 19a-19N. Each one of the optical assemblies 19a-19N is in optical communication with the optical structure 16 to receive light signals 18a-18N (or more simply, light) on respective light paths. The optical assembly 19a, which is representative of the other optical assemblies 19b-19N, includes a multiple-bandpass optical filter 20 in optical communication with the optical structure 16 to receive the light signal 18a. A color optical filter 24 is in optical communication with the multiple-bandpass optical filter 20 to receive a light signal 22. A light transducer 28 is in optical communication with the color filter 24 to receive a light signal 26. The transducer 28 generates a signal 30a. The system 10 also includes a processor 32 coupled to the transducer 28 and coupled to other ones of the optical assemblies 19b-19N to receive the signal 30a and signals 30b-30N. In some embodiments, the signals 30a-30N are electrical signals. The system 10 can also include a light source 12.

The system 10 is adapted to receive light 14 from an object 13 and to generate one or more spectral images 34. The light 14 can include reflected light associated with the light source 12, which is reflected from the object. The light 14 can also include reflected light from other light sources. In some embodiments, no light source 12 is provided.

The optical structure 16 receives the light 14 from the object 13 and splits the light into light signals 18a-18N propagating on separate light paths. Each of the light signals 18a-18N corresponds to a respective image of an object 13, also referred to herein as an "image clone." While a plurality of light signals 18a-18N are shown, in other embodiments, the optical structure 16 is omitted or altered resulting in but one light signal 18a. The optical structure 16 is described more fully below in conjunction with FIG. 5.

The light signals 18a-18N (i.e., image clones of the object 13) are received by the respective optical assemblies 19a-19N. Taking the optical assembly 19a as representative of the other optical assemblies 19b-19N, the light signal 18a is received by the multiple-bandpass optical filter 20. The multiple-bandpass optical filter 20 has at least two narrow optical passbands (also referred to herein as spectral bands). The light signal 22 emerging from the multiple-bandpass optical filter has a dominant spectral content in the at least two passbands. In some embodiments, the multiple-bandpass optical filter 20 is a quadruple bandpass (QBPF) optical filter, having four spectral bands. In other embodiments, the multiple-bandpass optical filter 20 is a triple bandpass optical filter (TBPF), having three spectral bands. In some embodiments, a wavelength range of each of the spectral bands is about twenty-five nanometers (nm).

The filtered light signal 22 is received by the color optical filter 24. The color optical filter 24 has a grid of optical microfilters arranged in segments, and each segment has at least two microfilters and associated passbands. The microfilters (i.e., the passbands) of the color optical filter 24 are disposed at different spatial positions on the color optical filter 24. In one particular arrangement, the color optical filter 24 is a cyan-magenta-yellow-green (CMYG) optical filter. In another particular arrangement, the color optical filter 24 is a red-green-blue (RGB) optical filter. In yet another particular arrangement, the color optical filter 24 is a red-green-blue-emerald (RGBE) optical filter. However, any color filter can be used having segments with at least two microfilters and associated passbands.

The transducer 28 receives the light signal 26 from the color optical filter 24, and converts the light signal 26 into a signal 30a. In some embodiments, the signal 30a is an electrical signal. In some embodiments, the transducer 28 is a CCD array having a plurality of CCD pixels, each one of the CCD pixels disposed in optical communication with a respective one of the microfilters (i.e., passbands) of the color optical filter 24. In these arrangements, the signal 30a is a plurality of signals, one signal from each one of the pixels of the CCD array.

The processor 32 receives and processes the signal 30a and generates a set of one or more spectral images 34 of the object 13. The signal 30a includes information representative of light in one or more of the passbands of the multiple-bandpass optical filter 20. Accordingly, some of the spectral images in the set of spectral images 34 are also representative of light in one or more of the passbands of the multiple-bandpass optical filter 20. For example, in embodiments for which the multiple-bandpass optical filter 20 has four passbands, the set of spectral images 34 can include separate spectral images representative of light in each one of the four passbands.

While a multiple-bandpass optical filter 20 is shown, it will be understood that in other embodiments, another type of optical filter can be used, for example, a polychroic mirror. Also, in some other embodiments, the optical filter 20 (and similar optical filters in the other optical assemblies 19b-19N) can be an integral part of the optical structure 16.

In some embodiments, other ones of the optical processing portions 19b-19N have respective multiple-bandpass optical filters (or, more generally, optical filters) with different passbands. The other optical assemblies 19b-19N generate other signals 30b-30N similar to the signal 30a, each having information representative of light in or more of the different passbands. Accordingly, with these arrangements, some of the spectral images in the set of spectral images 34 can also be representative of light in one or more of the different passbands associated with the optical assemblies 19b-19N.

Color optical filters used in other ones of the optical assemblies 19b-19N can be the same as or different from the color optical filter 24. Furthermore, multiple-bandpass optical filters used in other ones of the optical assemblies 19b-19N can be the same as or different from the multiple-bandpass optical filter 20.

It should be appreciated that some conventional CCD cameras have mechanical characteristics similar to the system 10. However, a conventional CCD camera does not include a multiple-bandpass optical filter 20 nor does it include the processor 32, which provides separate spectral images as in the system 10.

Figure 2:
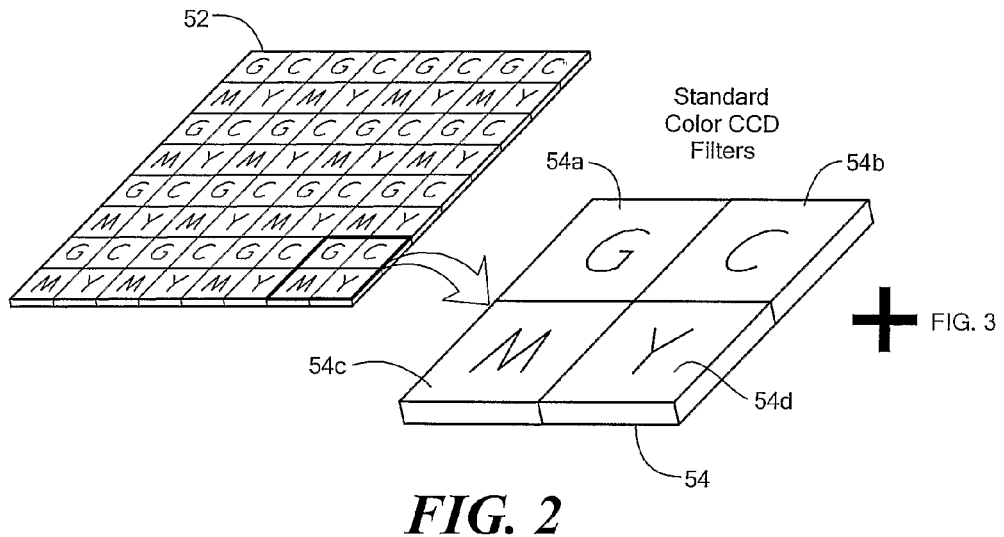
FIG. 2 is a pictorial showing a standard color charge coupled (CCD) device having four color filters, which is associated with the multispectral imaging system of FIG. 1.

Referring to FIG. 2, a color optical filter 52 which can be the same as or similar to as the color optical filter 24 of FIG. 1, includes a plurality of segments 54 arranged in a repeating grid pattern. Each filter segment 54 has four single-color microfilters 54a-54d disposed in different spatial positions in the segment 54, and therefore, in the color optical filter 52. The segment 54 has the four single-color microfilters 54a-54d and associated passbands (also spectral bands), which can correspond to green, cyan, magenta, and yellow passbands, respectively, forming a CMYG filter.

As will become apparent from discussion below, the color optical filter 52 can be disposed in optical communication with a CCD array (not shown), such that each one of the single-color microfilters 54a-54d is in optical communication with a single respective CCD pixel.

Figure 2A:
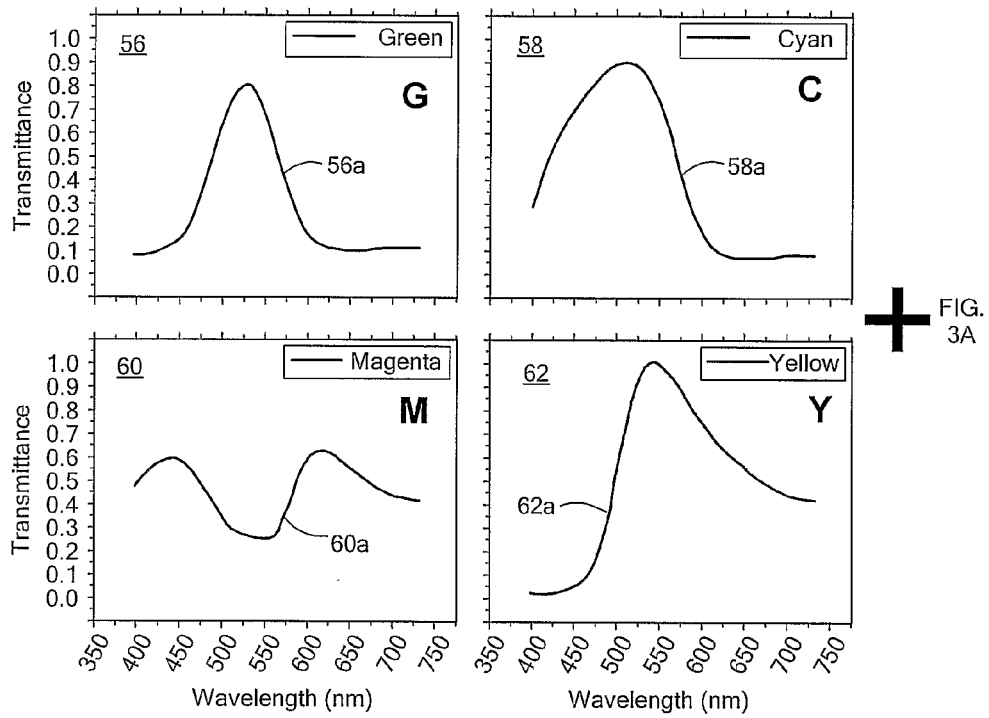
FIG. 2A is a set of graphs showing optical spectra associated with the four colors of the CCD filters of FIG. 2.

Referring now to FIG. 2A, graphs 56-62 have vertical axes in units of transmittance from 0.0 to 1.0, and horizontal axes in units of wavelength, from three hundred fifty nanometers to seven hundred fifty nanometers. The graph 56 has a curve 56a representative of a green passband associated with the single-color microfilter 54a. The graph 58 has a curve 58a representative of a cyan passband associated with the single-color microfilter 54b. The graph 60 has a curve 60a representative of a magenta passband associated with the single-color microfilter 54c. The graph 62 has a curve 62a representative of a yellow passband associated with the single-color microfilter 54d. It should be recognized that each of the curves 56a, 58a, 60a, 62a is indicative of a respective relatively wide passband.

Figure 3:
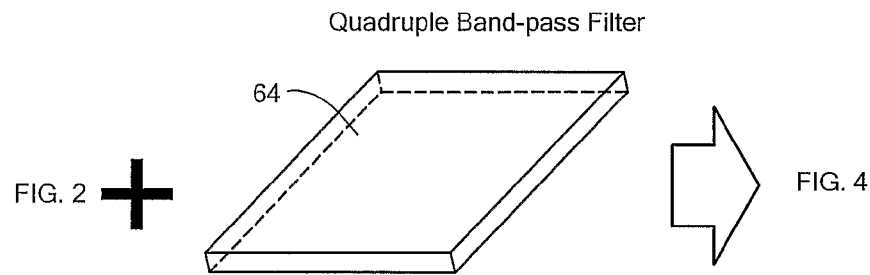
FIG. 3 is a pictorial of a quadruple bandpass filter (QBPF)

Referring now to FIG. 3, a multiple-bandpass optical filter 64, which may be similar to or the same as the multiple-bandpass optical filter 20 described above in conjunction with FIG. 1, includes four passbands (or spectral bands), and is thus also referred to herein as a quadruple bandpass filter (QBPF). The QBPF 64 can be used in combination with the color optical filter 52 of FIG. 2.

Figure 3A:
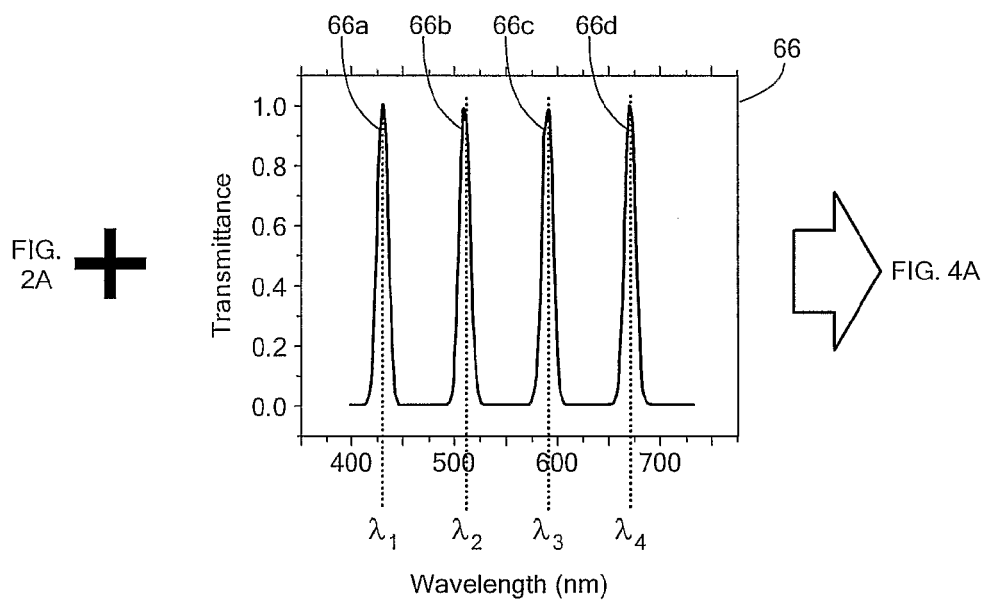
FIG. 3A is set of graphs indicative of four optical passbands of QBPF of FIG. 3

Referring now to FIG. 3A, a graph 66 has a curve with four passbands 66a-66d centered at wavelengths $\lambda_1$-$\lambda_4$, respectively, representative of the four passbands of the multiple-bandpass optical filter 64 of FIG. 3. It will be recognized that the multiple-bandpass optical filter 64 has the four passbands continuously over all or a substantial portion of the multiple-bandpass optical filter 64 and does not have spatial segments and separately spatially disposed passbands, as does the color optical filter 54.

Figure 4:
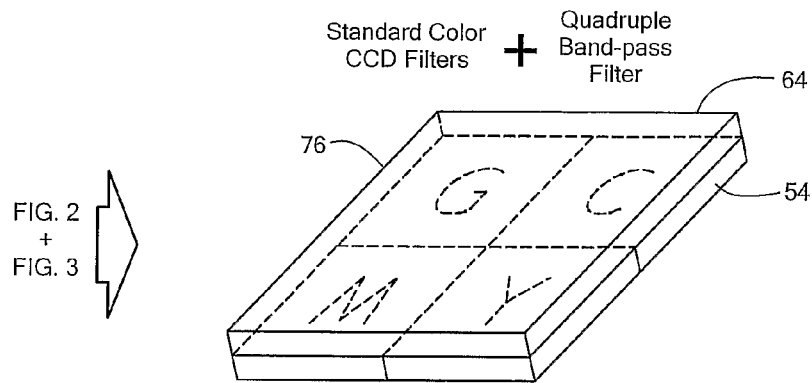
FIG. 4 is pictorial showing a combination of the color CCD of FIG. 2 with the QBPF of FIG. 3.

Referring now to FIG. 4, a filter assembly 76 includes both the color optical filter segment 54 of FIG. 2 and the multiple-bandpass optical filter 64 of FIG. 3. While the assembly is shown having only one segment 54 and associated multiple-bandpass optical filter 64, this arrangement is representative of a larger multiple-bandpass optical filter 64 in optical communication with the entire color optical filter 52.

Figure 4A:
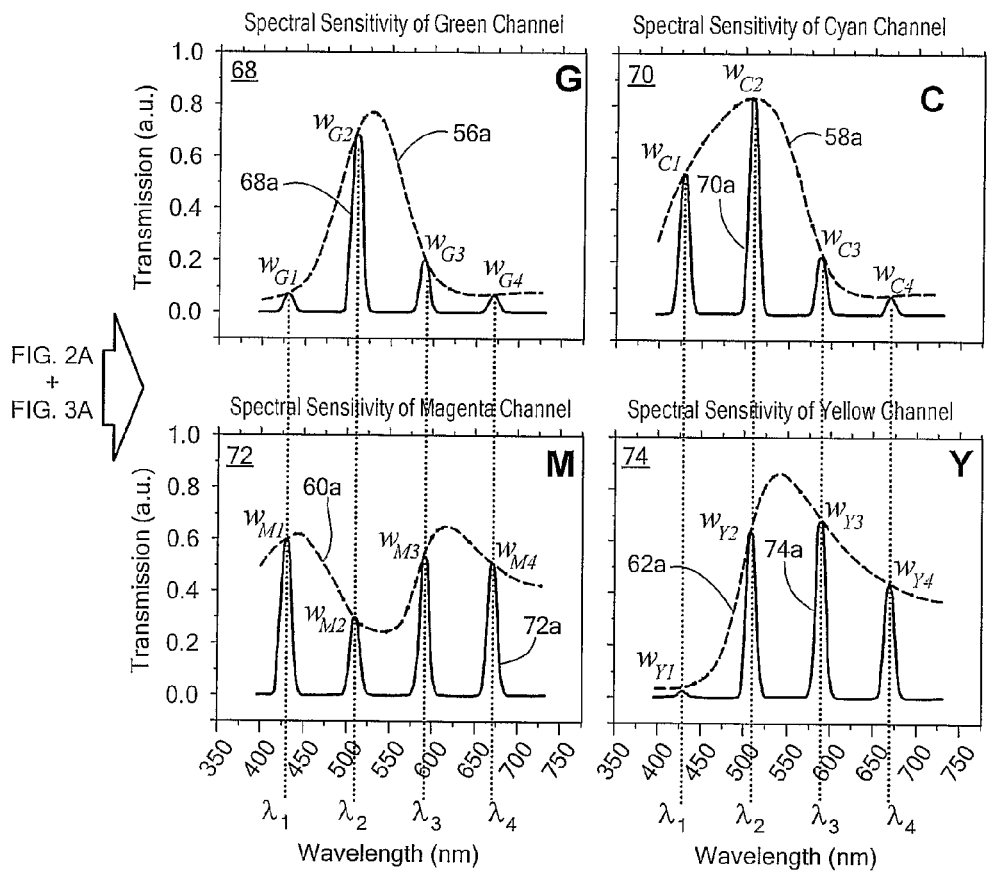
FIG. 4A is set of graphs showing combinations of the spectra of FIG. 2A with the passbands of FIG. 3A.

Referring now to FIG. 4A, a graph 68 has the curve 56a of the graph 56 (FIG. 2A), which forms an envelope associated with the green passband (i.e., microfilter 54a of FIG. 2). When the green envelope 56a (FIG. 2A) is applied to the four passbands 66a-66d (FIG. 3A) of the multiple-bandpass optical filter 64 (FIG. 3), a curve 68a results, having four passbands with amplitudes $w_{G1}$-$w_{G4}$, which follow the envelope defined by curve 56a (FIG. 2A). A graph 70 has the curve 58a of the graph 58 (FIG. 2A), which forms an envelope associated with the cyan passband (i.e., microfilter 54b of FIG. 2). When the envelope 58a (FIG. 2A) is applied to the four passbands 66a-66d of the multiple-bandpass optical filter 64, a curve 70a results, having four passbands with amplitudes $w_{C1}$-$w_{C4}$, which follow the envelope 58a (FIG. 2A). A graph 72 has the curve 60a of the graph 60 (FIG. 2A), which forms an envelope associated with the magenta passband (i.e., microfilter 54c of FIG. 2). When the envelope 60a (FIG. 2A) is applied to the four passbands 66a-66d of the multiple-bandpass optical filter 64, a curve 72a results, having four passbands with amplitudes $w_{M1}$-$w_{M4}$, which follow the envelope 60a. A graph 74 has the curve 62a of the graph 62 (FIG. 2A), which forms an envelope associated with the yellow passband (i.e., microfilter 54d (FIG. 2)). When the envelope 62a (FIG. 2A) is applied to the four passbands 66a-66d of the multiple-bandpass optical filter 64, a curve 72a results, having four peak having amplitudes $w_{Y1}$-$w_{Y4}$, which follow the envelope 62a.

Taking the graph 68 as representative of the other graphs 70-74, amplitudes $w_{G1}$-$w_{G4}$ are representative of relative light amplitudes that would result after passing light signals of uniform amplitude at wavelengths $\lambda_1$-$\lambda_4$ through the green filter 54a and through the multiple-bandpass optical filter 64 of the assembly 76. As mentioned above, the green filter 54a and associated passband are in optical communication with only one CCD pixel as described above. Thus, CCD pixel provides only one output signal associated with the four passband with amplitudes $w_{G1}$-$w_{G4}$.

Having the one output signal corresponding to the graph 68, it is not possible to identify an amplitude of light in each of the passbands 66a-66d. However, each of the other respective ones of the four single-color microfilters 54a-54d of the segment 54, are also coupled to a single CCD pixel and provide other respective signal. Thus, by methods described below, the single outputs from four CCD pixels associated with the graphs 68-74, can be used to identify a magnitude of light in each of the passband 66a-66d and four spectral images of an entire object area (e.g., 13, FIG. 1) can be generated simultaneously.

As described above, a signal generated by each CCD pixel does not represent only one of the narrow spectral bands 66a-66d exclusively, but rather the signal is a linear combination of contributions from light in all four of the spectral bands 66a-66d. Each one of the CCD output signals is generated in accordance with a combination of light amplitudes $w_{G1}$-$w_{G4}$, $w_{G1}$-$w_{G4}$, $w_{G1}$-$w_{G4}$, or $W_{G1}$-$w_{G4}$. Nevertheless, it is possible to combine output signals generated from four CCD pixels, corresponding to the graphs 68-74, in order to calculate the light intensity in each one of the four narrow spectral bands 66a-66d.

For the system 10 of FIG. 1 light passing through the optical assembly 76 (i.e., filters 20, 24, FIG. 1) is received by a set of four CCD pixels, (i.e., transducer 28, FIG. 1 having at least four CCD pixels). The four CCD pixels generate four signals $S_C$, $S_M$, $S_Y$, $S_G$ corresponding to the four graphs 68-74, respectively. The signals generated by each pixel are related to a sensitivity ($w_{x,i}$, i={1,2,3,4}, x={C, M, Y, G}) of the pixel to each of the narrow spectral bands 66a-66d and to an intensity ($I_\lambda i$={$\lambda_1$, $\lambda_2$, $\lambda_3$, $\lambda_4$}) of the light at the narrow bands 66a-66d in the image, (i.e., 18a, FIG. 1) of the object. A signal generated by a pixel N can be written as: $S_{N=wx1} \cdot I_{\lambda 1} + w_{x2} \cdot I_{\lambda 2} + w_{x3} \cdot I_{\lambda 3} + w_{x4} \cdot I_{\lambda 4}$, where x=C or M or Y or G depending on which color filter covers pixel N. Equations having the same form can be written for each of the CMYG pixels in optical communication with the assembly 76:

$$S_C = w_{C1} \cdot I_{\lambda_1} + w_{C2} \cdot I_{\lambda_2} + w_{C3} \cdot I_{\lambda_3} + w_{C4} \cdot I_{\lambda_4} \tag{1a}$$

$$S_M = w_{M1} \cdot I_{\lambda_1} + w_{M2} \cdot I_{\lambda_2} + w_{M3} \cdot I_{\lambda_3} + w_{M4} \cdot I_{\lambda_4} \tag{1b}$$

$$S_Y = w_{Y1} \cdot I_{\lambda_1} + w_{Y2} \cdot I_{\lambda_2} + w_{Y3} \cdot I_{\lambda_3} + w_{Y4} \cdot I_{\lambda_4} \tag{1c}$$

$$S_G = w_{G1} \cdot I_{\lambda_1} + w_{G2} \cdot I_{\lambda_2} + w_{G3} \cdot I_{\lambda_3} + w_{G4} \cdot I_{\lambda_4} \tag{1d}$$

$$\rightarrow \begin{bmatrix} S_C \\ S_M \\ S_Y \\ S_G \end{bmatrix} = \begin{bmatrix} w_{C1} & w_{C2} & w_{C3} & w_{C4} \\ w_{M1} & w_{M2} & w_{M3} & w_{M4} \\ w_{Y1} & w_{Y2} & w_{Y3} & w_{Y4} \\ w_{G1} & w_{G2} & w_{G3} & w_{G4} \end{bmatrix} \cdot \begin{bmatrix} I_{\lambda_1} \\ I_{\lambda_2} \\ I_{\lambda_3} \\ I_{\lambda_4} \end{bmatrix} \tag{2}$$

$$S = W \cdot I_\lambda$$

In the above equations, $S_C$ is a signal generated by a pixel in optical communication With the cyan single-color microfilter 54b of the assembly 76 corresponding to the graph 70, $S_M$ is a signal generated by a pixel in optical communication with the magenta single-color microfilter 54c of the assembly 76 corresponding to the graph 72, $S_Y$ is a signal generated by a pixel in optical communication with the yellow single-color microfilter 54d of the assembly 76 corresponding to the graph 74, and $S_G$ is a signal generated by a pixel in optical communication with the green single-color microfilter 54a of the assembly 76 corresponding to the graph 68.

The above set of linear equations (1a-1d) can be also written as a linear matrix equation:

$$S = w \cdot I_\lambda \rightarrow I_\lambda = w^{-1} \cdot S \tag{3}$$

Where S is the signal $S_C$, $S_M$, $S_Y$, $S_G$ generated by each pixel, w is a system sensitivity matrix, and $I_\lambda$ is an intensity of light at each of the four narrow spectral bands 66a-66d having central wavelengths $\lambda_1$, $\lambda^2$, $\lambda_3$, $\lambda_4$.

An intensity ($I_i$, i={$\lambda_1$, $\lambda_3$, $\lambda_3$, $\lambda_4$}) of light in the image (e.g., 18a, FIG. 1) of the object (e.g., 13, FIG. 1) at each of the four narrow spectral bands 66a-66d can be calculated by combining (simultaneously solving) the above four linear equations, if the sensitivity matrix w is known. Values of the sensitivity matrix w depend on several factors, including but not limited to, a transmission spectra of the color filter (e.g. CMYG filter 52), a transmission spectrum of the multiple-bandpass optical filters (e.g., multiple-bandpass optical filter 64), a sensitivity of a light detector used to detect light passing through the filters, and a transmission spectrum of other optics used, for example, a lens.

Values of the matrix w can be measured in advance, i.e., the system can be calibrated, either by measuring objects (e.g., 13, FIG. 1) having known spectral characteristics or by measuring light sources (e.g., 36, FIG. 1) having known emission spectra. Once measured, the sensitivity matrix w is known for all objects and corresponding images. For example, if four light sources, with known light intensities at wavelengths $\lambda_1$, $\lambda_3$, $\lambda_3$, $\lambda_4$ are used for calibration, resulting in sixteen output signals from the four pixels in optical communication with the four single-color microfilters 54a-54d, then the sixteen intensities at the wavelengths $\lambda_1$, $\lambda_3$, $\lambda_3$, $\lambda_4$ are known in advance and values in the intensity matrix w can be computed using sixteen equations and sixteen unknowns (in the sensitivity matrix).

The above-described combination of linear equations can be performed in a processor, for example, the processor 32 of FIG. 1, which can be comprised of a computer, a microprocessor, or a custom application specific integrated circuit.

While the color optical filter 52 is shown to have the segments, e.g., 54, each with four single-color microfilters 54a-54b and four corresponding passbands, cyan, yellow, magenta, and green passbands, in other embodiments, the four color passband are red, green blue, and emerald (RGBE). In other embodiments, each segment of the color optical filter has three single-color microfilters and three corresponding passbands, for example, red, green, and blue (RGB) passbands and the multiple-bandpass optical filter has three narrow passbands accordingly in order to provide three linear equations with three unknowns. However, in other embodiments, the color optical filter 52 can have segments with two or more passbands and the multiple-bandpass optical filter 64 can have two or more narrow passbands.

It will be appreciated that, if the number of bands of the multiple-bandpass filter 64 is smaller than the number of microfilters 54a-54d, then the processing described by equations 1a-1d above is overdetermined and can result a more accurate calculation of light intensity.

While the multiple-bandpass optical filter 64 is shown to be in close proximity to the color optical filter segment 54 in the assembly 76, in other arrangements, the multiple-bandpass optical filter 64 may be spaced apart (even by a relatively large distance or with other intervening optical elements) from the color optical filter segment 54, but still in optical communication with the color optical filter segment 54.

Figure 5:
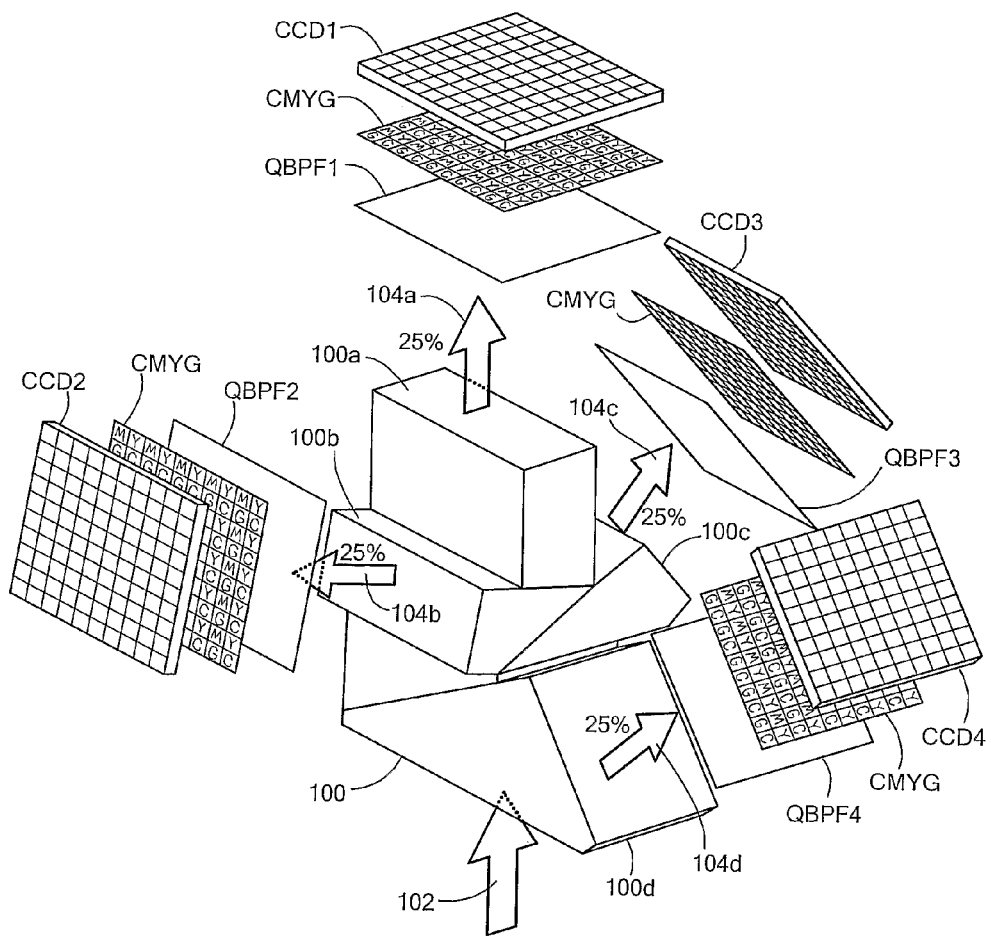
FIG. 5 is a block diagram showing an exemplary optical structure associated with the multispectral imaging system of FIG. 1, having four light paths and four QBPFs.
Figure 5A:
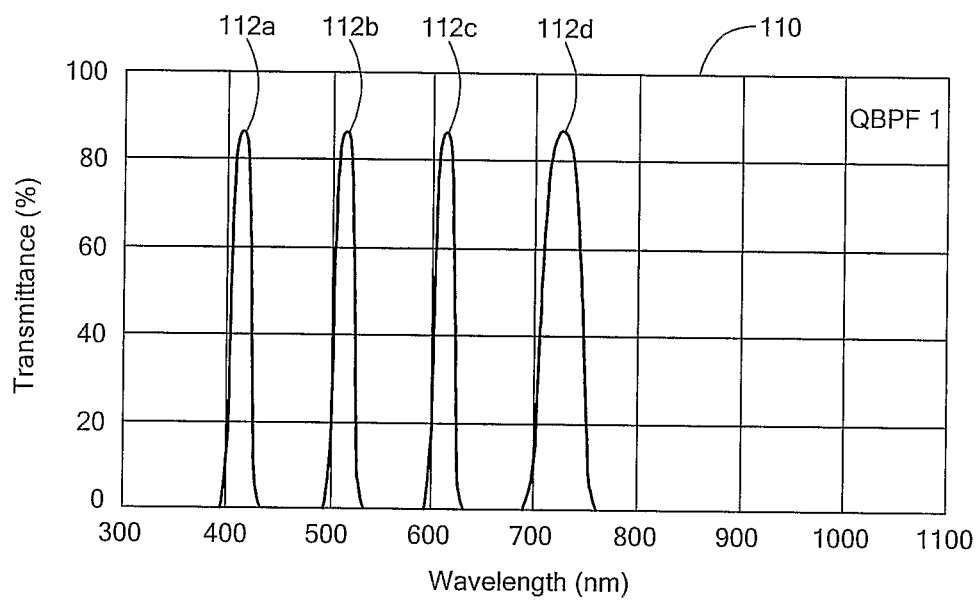
FIG. 5A is a graph showing four optical passbands of a first QBPF of FIG. 5.
Figure 5B:
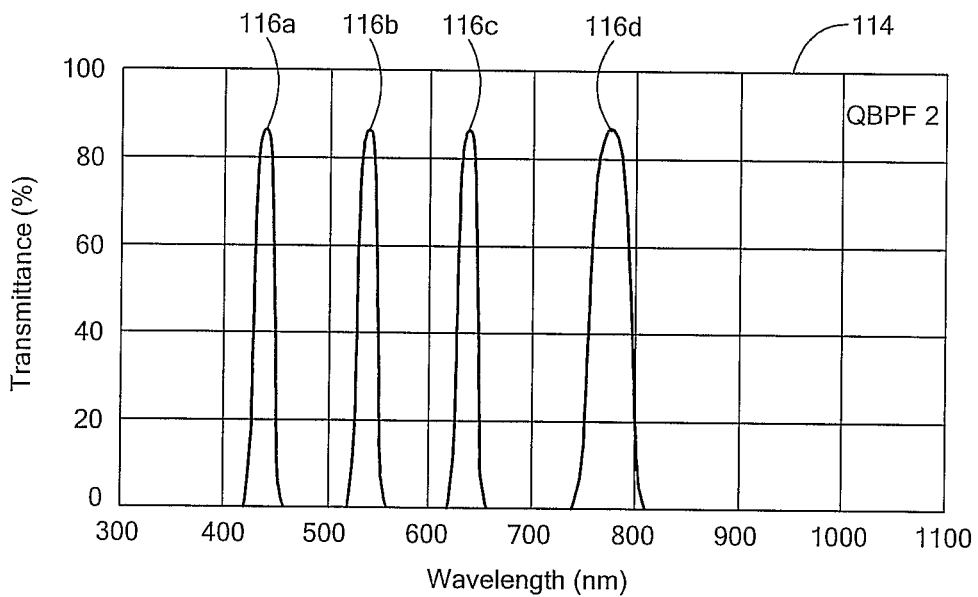
FIG. 5B is a graph showing four optical passbands of a second QBPF of FIG. 5.
Figure 5C:
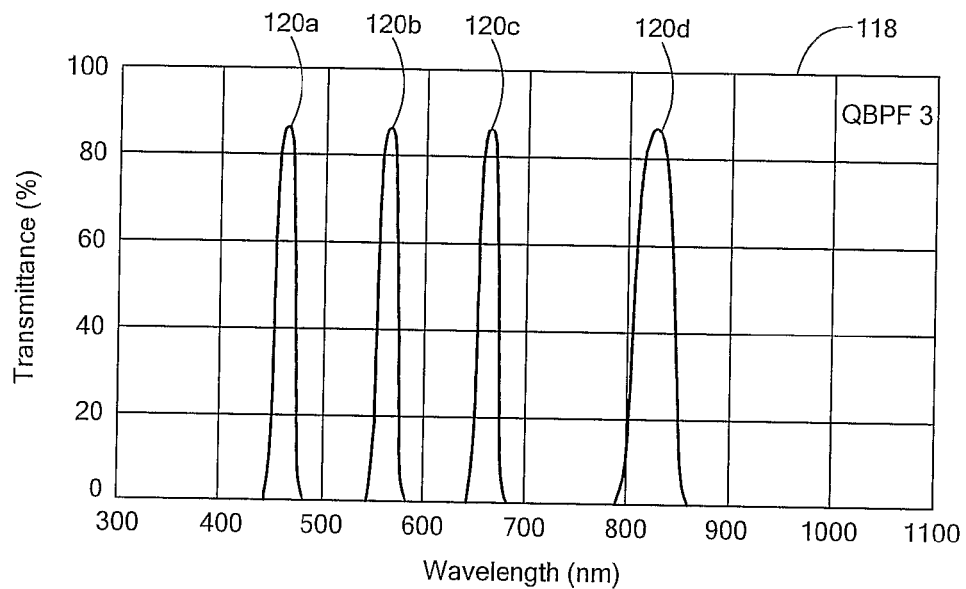
FIG. 5C is a graph showing four optical passbands of a third QBPF of FIG. 5.
Figure 5D:
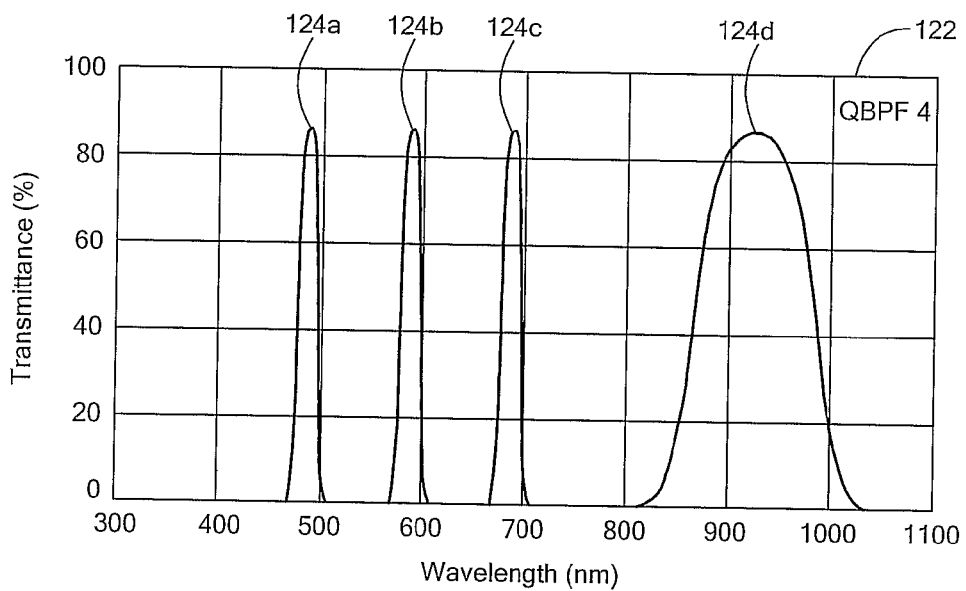
FIG. 5D is a graph showing four optical passbands of a fourth QBPF of FIG. 5.

Referring now to FIG. 5, an optical structure 100, which may be the same as or similar to the optical structure 16 of FIG. 1, includes a plurality of prisms 100a-100d. The optical structure 100 is adapted to receive a light image 102, for example, the light image 14 of FIG. 1, and to split the light image 102 into two or more light signals (i.e., image clones) on a respective two or more light paths. Here four image clones 104a-104d are shown, which can be the same as or similar to the image clones 18a-18N of FIG. 1. In one particular embodiment, each one of the image clones 104a-104d can have an equal percent of the light intensity of the original image 102 (e.g. twenty-five percent). However, in other embodiments the image clones 104a-104d can have different percentages of the light intensity of the original image 102

The first image clone 104a is received by a first quad bandpass filter QBPF1, a first color optical filter CMYG1, and a first CCD array CCD1. The second image clone 104b is received by a second quad bandpass filter QBPF2, a first color optical filter CMYG2, and a second CCD array CCD2. The third image clone 104c is received by a third quad bandpass filter QBPF3, a third color optical filter CMYG3, and a third CCD array CCD3. The fourth image clone 104d is received by a fourth quad bandpass filter QBPF4, a fourth color optical filter CMYG4, and a fourth CCD array CCD4.

Referring now to FIGS. 5A-5D, the four quad bandpass filters QBPF1, QBPF2, QBPF3 QBPF4 of FIG. 5 can have different passbands, represented by four graphs 110, 114, 118, 122, respectively. The graphs 110, 114, 118, 122 have vertical axes in units of percent transmittance from zero to one hundred percent and horizontal axes in units of wavelength from three hundred nanometers to eleven hundred nanometers. The first quad bandpass filter QBPF1 has passbands 112a-112d, the second quad bandpass filter QBPF2 has passbands 116a-116d, the third quad bandpass filter QBPF3 has passbands 116a-116d, and the fourth quad bandpass filter QBPF4 has passbands 124a-124d.

Using the optical structure 100 of FIG. 5 in a system, for example, as the optical structure 16 in the system 10 of FIG. 1, and using the processing described above in conjunction with FIG. 2, it should be recognized that sixteen spectral images can be simultaneously captured in sixteen spectral bands, four associated with each one of the four image clones 104a-104d.

While an optical structure 100 of FIG. 5 is shown having the four prisms 100a-100d to generate the four image clones 104a-104d, in other arrangements, the optical structure can be provided having more than four or fewer than four prisms to generate a corresponding more than four or fewer than four image clones. In one particular arrangement, an optical structure having five prisms and five corresponding image clones, in combination with five color optical filters and five different quad bandpass filters (QBPFs) can generate twenty spectral images simultaneously. However, other arrangements are also possible having an optical structure with any number of prisms and a corresponding number of light paths (image clones).

In some arrangements, the prisms 100a-100d of FIG. 5 can also generate the four image clones 104a-104d having up to four different polarizations. This arrangement allows the measurement of image light intensity in different spectral bands and also at different polarizations. For example, in one particular arrangement using the optical structure 100, it would be possible to measure eight spectral bands at two different polarizations instead of measuring 16 spectral bands having the same polarization.

While the optical structure 100 is shown to be comprised of the prisms 100a-100d, the splitting of the original image 102 into the plurality of image clones 104a-104d can be accomplished in a variety of others ways, including but not limited to, a plurality of partially reflecting mirrors and a plurality of focusing elements.

In some embodiments, one or more of the four quad bandpass filters QBPF1, QBPF2, QBPF3, QBPF4 of FIG. 5 can be replaced with polychroic mirrors having passbands the same as or similar to passbands of the quad bandpass filters QBPF1, QBPF2, QBPF3, QBPF4. In some such embodiments, the polychroic mirrors are disposed at the same positions as the quad bandpass filters QBPF1, QBPF2, QBPF3, QBPF4. However, in other such embodiments, the polychroic mirrors are disposed on faces of the prisms 104a-104d, and are thus integral to the optical structure 100. One of ordinary skill in the art will be able to identify prism faces on which to place polychroic mirrors in these embodiments.

It will be understood that, when using polychroic mirrors in association with faces of the prisms 100a-100d, the images at reference designations 104a-104d are not actually image clones, as each of the images 104a-104d can have different spectral content.

Figure 6:
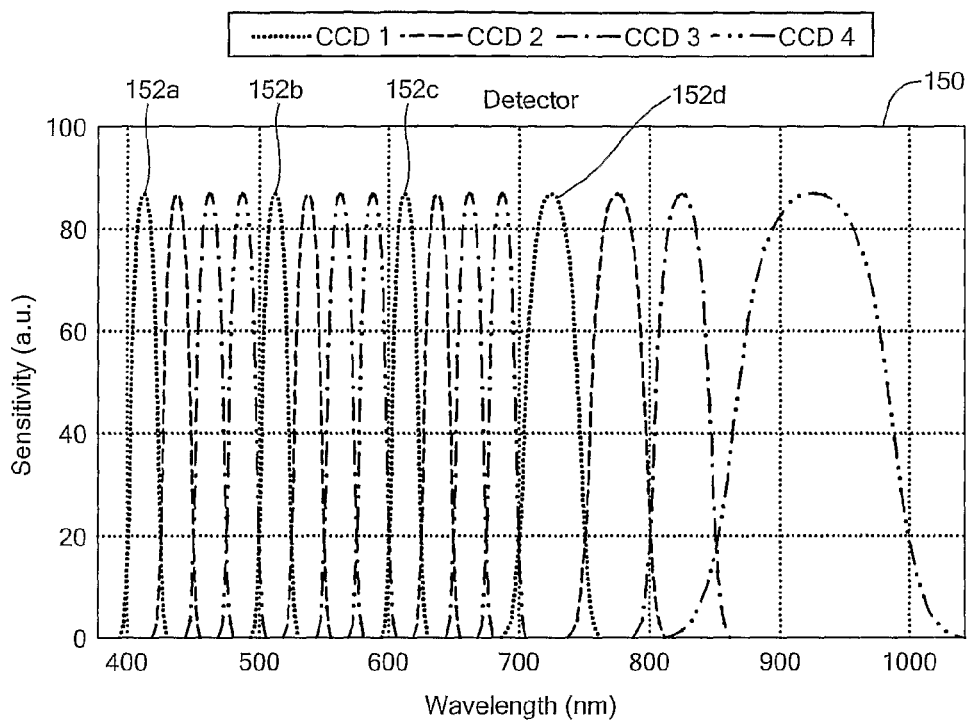
FIG. 6 is a graph showing a spectrum having spectral bands associated with the filters used in the multispectral imaging system of FIG. 1.

Referring now to FIG. 6, a graph 150 has a vertical axis of sensitivity expressed in arbitrary units (a.u.) and a horizontal axis in units of wavelength from four hundred nanometers to one thousand nanometers. A group of spectral bands 152a-152d are the same as or similar to the four bands 112a-112b of FIG. 5A, which are associated with the image clone 104a (FIG. 1). Other ones of the bands in FIG. 6 are the same as or similar to the bands 116a-116d, 120a-120d, and 122a-122d of FIG. 5B, but for clarity are not identified in FIG. 6 with reference designations. It will be appreciated that the sixteen spectral bands cover a substantial portion of the wavelength range of the graph 150.

Each of the various spectral bands of FIG. 6 correspond to a spectral image that can be generated by the system 10 of FIG. 1, when using the optical structure 100 of FIG. 5. Thus, using the arrangement of FIG. 5, the system 10 can generate sixteen spectral images of the object 13 (FIG. 1).

In some applications, it would be desirable to change the position of the sixteen spectral bands from time to time, or in different applications. However, the positions of the spectral bands are determined by the quad bandpass filters QBPF1, QBPF2, QBPF3, QBPF4 of FIG. 5. The quad bandpass filters QBPF1, QBPF2, QBPF3, QBPF4 are not necessarily easy to change.

Figure 6A:
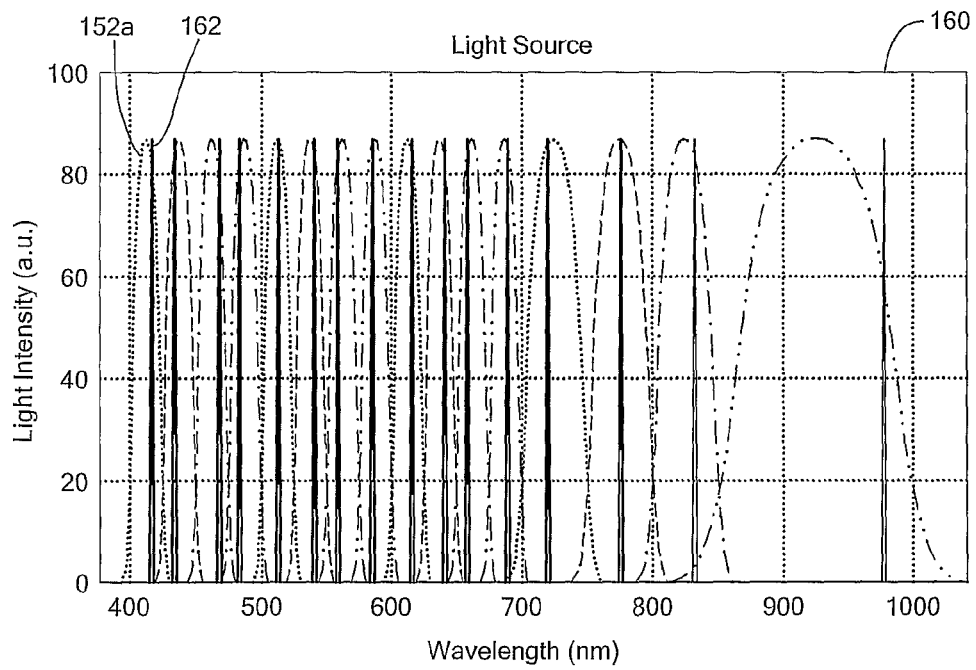
FIG. 6A is a graph showing a spectrum having spectral bands associated with the filters used in the multispectral imaging system of FIG. 1 and also having an emission spectrum associated with a multispectral light source.

Referring now to FIG. 6A, a graph 160 has a vertical axis of light intensity expressed in arbitrary units (a.u.) and a horizontal axis in units of wavelength from four hundred nanometers to one thousand nanometers. The graph 160 shows the sixteen spectral bands of FIG. 6, for example, the spectral band 152a. Sixteen spectral lines, of which line 162 is but one example, are indicative of a multispectral light source adapted to generate light in the sixteen narrow spectral bands represented by the sixteen lines, one spectral line generally positioned in each of the sixteen spectral bands.

With this arrangement having a multispectral light source, which generates light in spectral bands narrower than the sixteen spectral bands of FIG. 6, it should be understood that the resulting sixteen spectral images that can be generated are indicative of light intensity at wavelengths corresponding to each of the sixteen spectral lines, e.g., the spectral line 162. Therefore, using the above described processing, the sixteen spectral images can be changed in wavelength according to the positions of the sixteen spectral lines, i.e., the light of the light source, instead of the positions of the sixteen spectral bands of FIG. 6. In some embodiments, it is easier to change or adjust the positions of the spectral lines, e.g., the spectral line 162, than to change the position of the spectral bands, e.g., the spectral band 112a. Changing the output wavelengths of a light source can be easier or less expensive than changing multiple-bandpass optical filters, e.g., the quad bandpass filters QBPF1, QBPF2, QBPF3, QBPF4 of FIG. 5.

It will be understood that, in some embodiments in which a multispectral light source is used, no multiple-bandpass optical filters are needed, since the multispectral light source can provide a function similar to the multiple-bandpass optical filters.

The above-described multispectral light source can be use as the light source 12 of FIG. 1. In some arrangements, the multispectral light source is comprised of a plurality of filtered light sources (e.g., sixteen filtered light sources), each adapted to emit light having a narrow spectral band corresponding to a position of a respective one of the spectral lines.

While sixteen spectral lines are shown, each having a respective central wavelength, in other arrangements, the multispectral light source is adapted to generate light at more than sixteen or fewer than sixteen central wavelengths. Furthermore, if the number of central wavelengths at which the multispectral light source is adapted to generate light is less than the number of spectral bands associated with the multiple-bandpass optical filters, then some of the resulting spectral images can be associated with the wavelengths of the multispectral light source while others of the resulting spectral images can be associated with the spectral bands of the multiple-bandpass optical filters.

Figure 7:
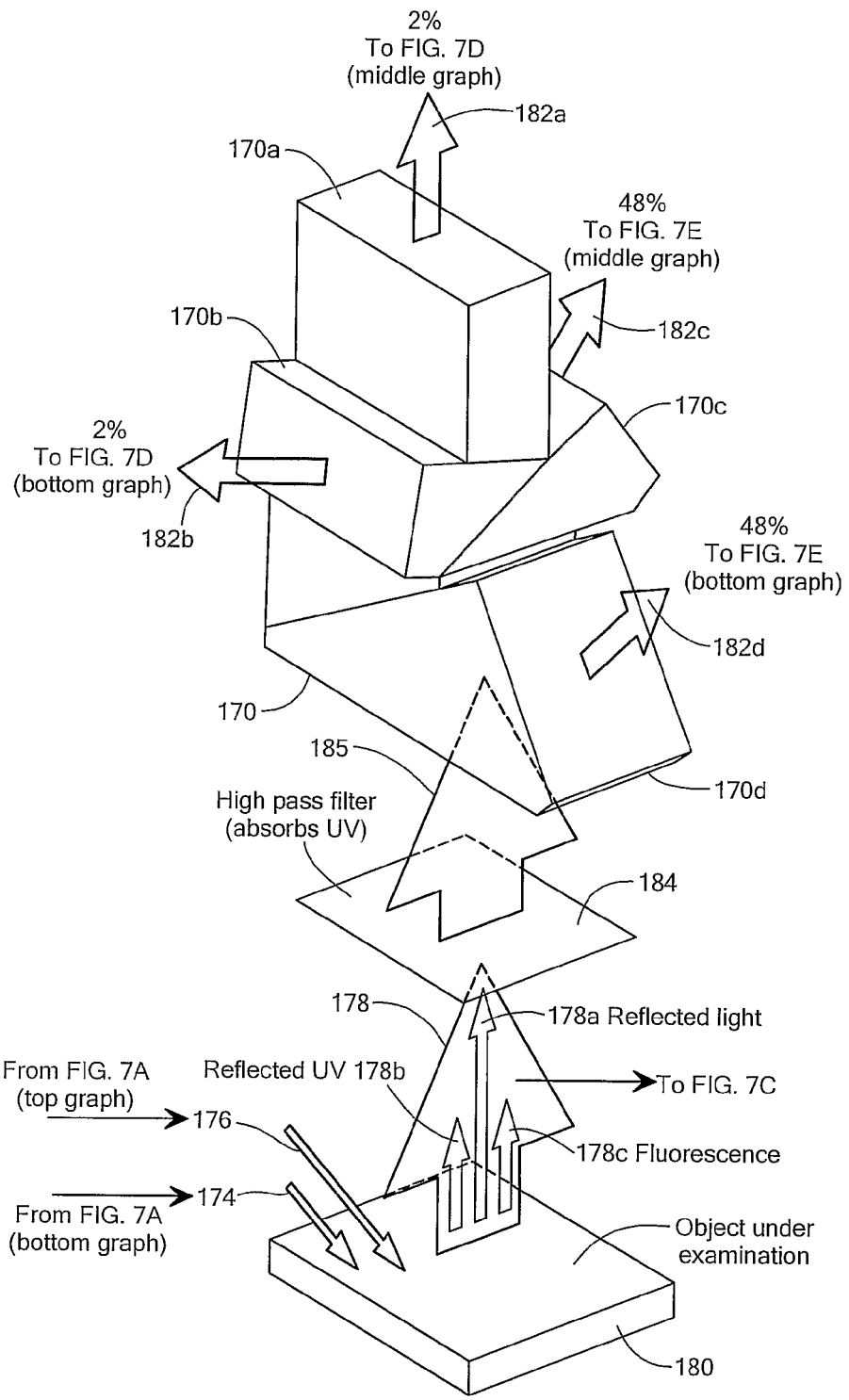
FIG. 7 is a block diagram showing another exemplary optical structure the multispectral imaging system of FIG. 1 that can be used to concurrently generate fluorescent light spectral images and reflected light spectral images, wherein the optical structure is being used to image an object.

Referring now to FIG. 7, an optical structure 170 can be the same as or similar to the optical structure 16 of FIG. 1. The optical structure 170 can be used to concurrently measure both reflectance and fluorescence of an object 180. The optical structure 170 includes a plurality of prisms 170a-170d.

A light image 178 includes a variety of light components, for example, a reflected light component 178a, a reflected ultraviolet component 178b, and a fluorescent light component 178c. The components 178a-178c result from lights 174, 176 being directed at an object 180.

The light 176 is multispectral light generated by a multispectral light source discussed above, for example, in conjunction with FIG. 6A. In some embodiments, the light 174 is ultraviolet light having a wavelength selected to excite fluorescence in the object 180. The fluorescence in the object 108 can be naturally occurring fluorescence or fluorescence associated with any number of fluorescent markers that can be injected into the object 180, ingested by the object 180, or coated on a surface of the object 180. The object 180 can be a human or other biological subject.

An optical high pass filter 184 can remove the ultraviolet component 178b, resulting in an image 185 having only the reflected light component 178a and the fluorescent light component 178c.

The optical assembly 170 is adapted to split the light image 185 into two or more light paths (i.e., image clones), here four image clones 182a-182d, which can be the same as or similar to the image clones 18a-18N of FIG. 1. In one particular embodiment, the first image clone 182a has two percent of the light intensity of the original image 185, the second image clone 182b has two percent, the third image clone 182c has forty-eight percent, and the forth image clone 182d has forty eight percent. However, in other embodiments the image clones 182a-182d can have different percentages of the original image 185.

In operation, each one of the image clones 182a-182d is received by a respective one of four quad bandpass filters (not shown), by a respective one of four color optical filters (not shown), and by a respective CCD array (not shown), as shown in FIG. 5, and processed as described above, to provide sixteen spectral images.

Typically, the fluorescence component 178c and reflectance component 178b of the object 180 cannot be measured simultaneously since the fluorescence component 178c and the reflectance component 178b are mixed together in the image 185 and cannot be distinguished. Therefore, conventionally, two separate measurements are required in order to measure both optical properties (reflectance and fluorescence) of an object.

Light sources can be used, which emit both short-wavelength (e.g. near-UV) light 174 or excitation of fluorescence and visible light 176 for the measurement of reflectance. The light 178 that originates from the object 180 is therefore a mixture of fluorescence and reflected light. The visible light 176 emitted by the light sources consists of multiple discrete very narrow spectral bands that cover only a small portion of the visible spectrum. As a result, the reflected light 178a will also be limited to light within those very narrow bands. Fluorescence is generally quite broadband and generally covers the entire visible spectrum. The spectrum of the light coming from the object 180 is comprised of the broadband fluorescent light component 178c plus the discrete narrow bands of the reflected light component 178a plus the reflected UV light component 178b. It should be recognized that at wavelengths between the narrow bands of the visible light source, the image 185 has only fluorescent light, while at frequencies within the narrow bands of the visible light source, the image 185 has a mixture of fluorescent light and reflected light.

Accordingly, some of the measured spectral bands, measured by the above described systems and techniques, are measured at wavelength between the narrow bands of the visible light source and others are measured at the narrow bands of the visible light source. Thus, some of the measurements are of fluorescent light only, and some of the measurements are of a combination of fluorescent and reflected light. Therefore, the fluorescent light and the reflected light can be separated into separate images.

Reflected light and fluorescent light can be most easily separated if the intensity of the reflected light is much higher than the intensity of the fluorescent light at the spectral bands in which the reflected light is measured. With this arrangement, the fluorescent light, which is measured in combination with the reflected light, can be neglected. However, if the fluorescent light component 178c cannot be neglected, then, being separately measured as described below, it can be subtracted.

Referring now to FIGS. 7A-7E, graphs 186, 190, 194, 198, 210, 214, 220, 224, 228 have vertical axes of light intensity expressed in arbitrary units (a.u) , graphs 202 and 206 have vertical axes of percent reflectance from zero to one hundred percent. All graphs 186, 190, 194, 198, 202, 206, 210, 214, 220, 224, 228 have horizontal axes in units of wavelength from three hundred nanometers to eleven hundred nanometers.

Figure 7A:
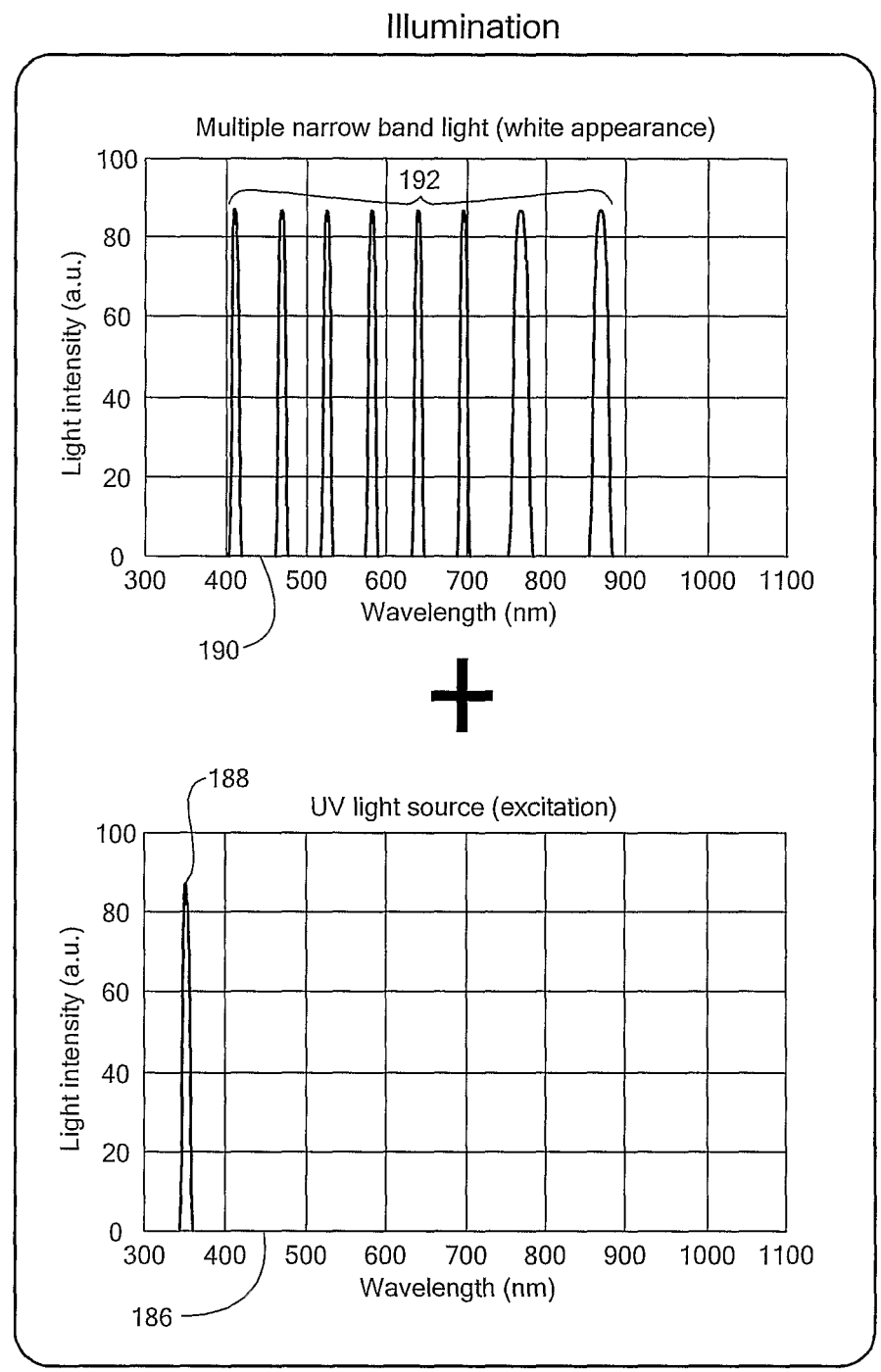
FIG. 7A is a set of two graphs, a first graph (top) showing a spectrum associated with a multi-spectral light source, which is used to illuminate the object with the optical structure of FIG. 7 in order to measure the object's reflectance, and a second graph (bottom) showing a spectrum associated with an ultraviolet light source, which is used to excite fluorescent light from the object shown in FIG. 7.

Referring now to FIG. 7A, the graph 186 has a spectral band 188 indicative of the ultraviolet light 174 used to excite the fluorescent light 178c from the object 180 (FIG. 7). The graph 190 has a plurality of spectral lines 192 indicative of the light 176 (FIG. 7) generated by the multispectral light source in the spectral bands 192.

Figure 7B:
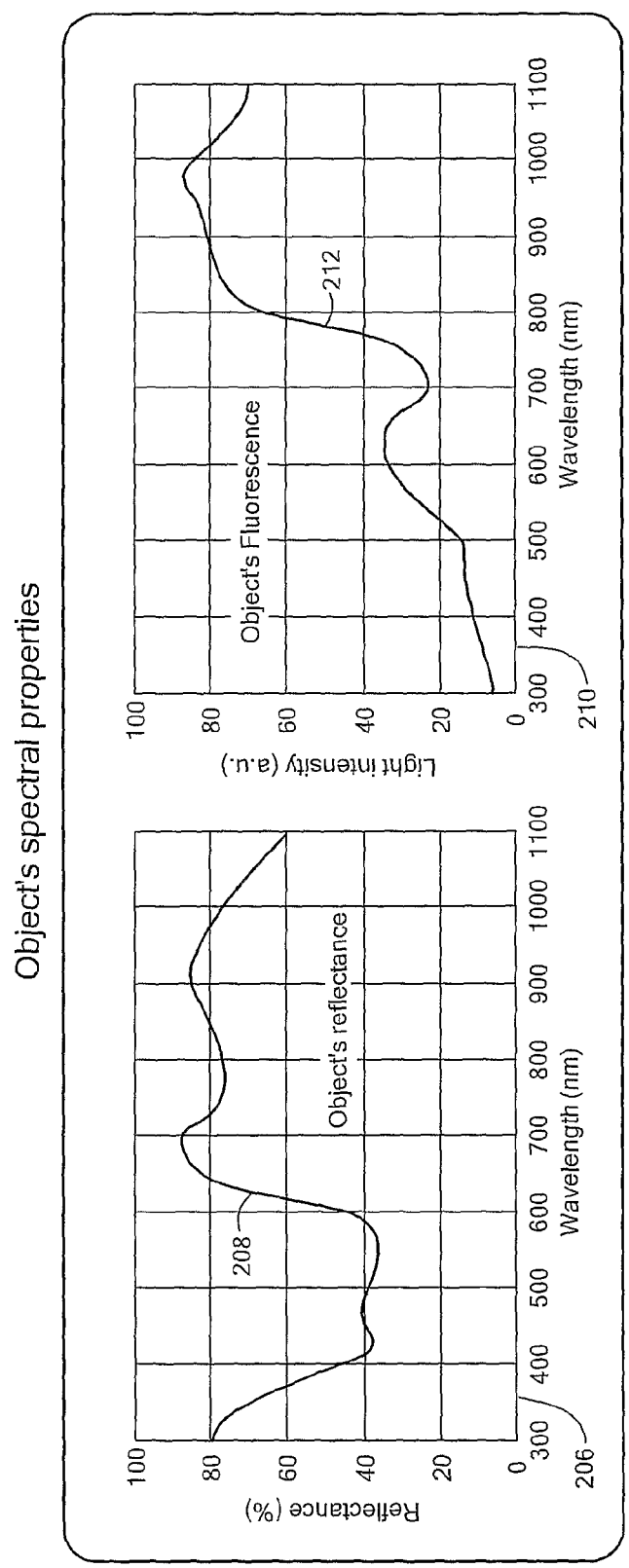
FIG. 7B is a set of two graphs, a first graph (left) showing a spectrum associated with actual (not measured) reflectance spectral properties of the object of FIG. 7, and a second graph (right) showing a spectrum associated with actual (not measured) fluorescent spectral properties of the object of FIG. 7.

Referring now to FIG. 7B, the graph 206 has a curve 208 representative of actual (not measured) reflectance spectral properties of the object 180 (FIG. 7). The graph 210 has a curve indicative of actual (not measured) fluorescent spectral properties of the object 180 (FIG. 7). It should be appreciated that the fluorescence has a relatively broad wavelength spectrum.

Figure 7C:
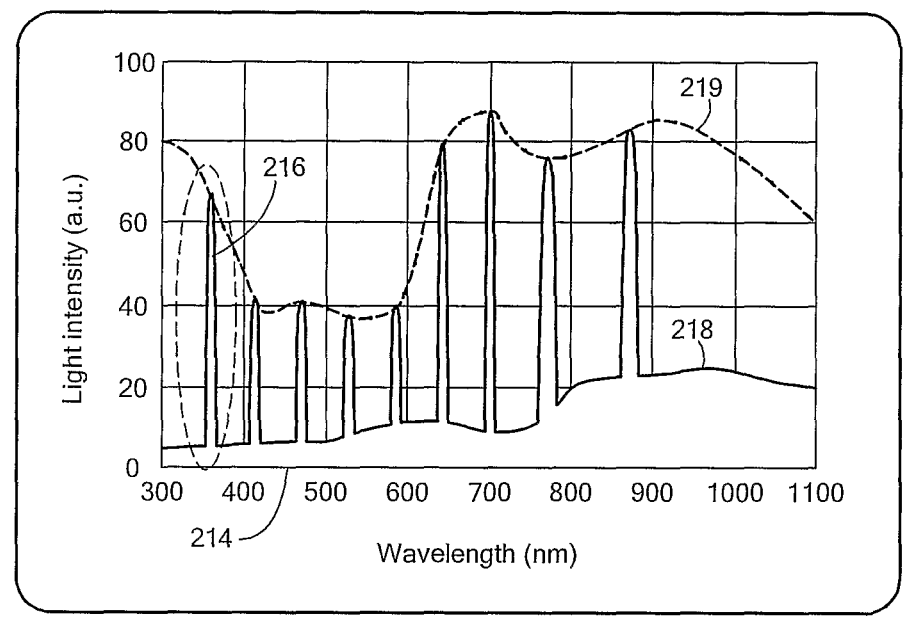
FIG. 7C is a graph indicative of all light (white light and fluorescent light) emanating from the object of FIG. 7.

Referring now to FIG. 7C, the graph 214 is indicative of all light in the image 185 (FIG. 7) of the object 180 (FIG. 7). The graph 214 includes eight spectral bands, for which the spectral band 216 is but one example, a portion 218, and a curve 219 indicative of an envelope of the spectral bands. The spectral bands and the portion 218 together represent the received light 185 (FIG. 7), having both the spectral bands associated with the spectral bands of the graph 190, which are generated by the multispectral light source, and also the portion 218, associated with the curve 212 in the graph 210, which is indicative a spectrum of the fluorescent light component 178c (FIG. 7). Light in the spectral bands (e.g., 216) of the graph 214 includes both reflected and fluorescent light. Light between the spectral bands (e.g., 216) includes only fluorescent light.

Figure 7D:
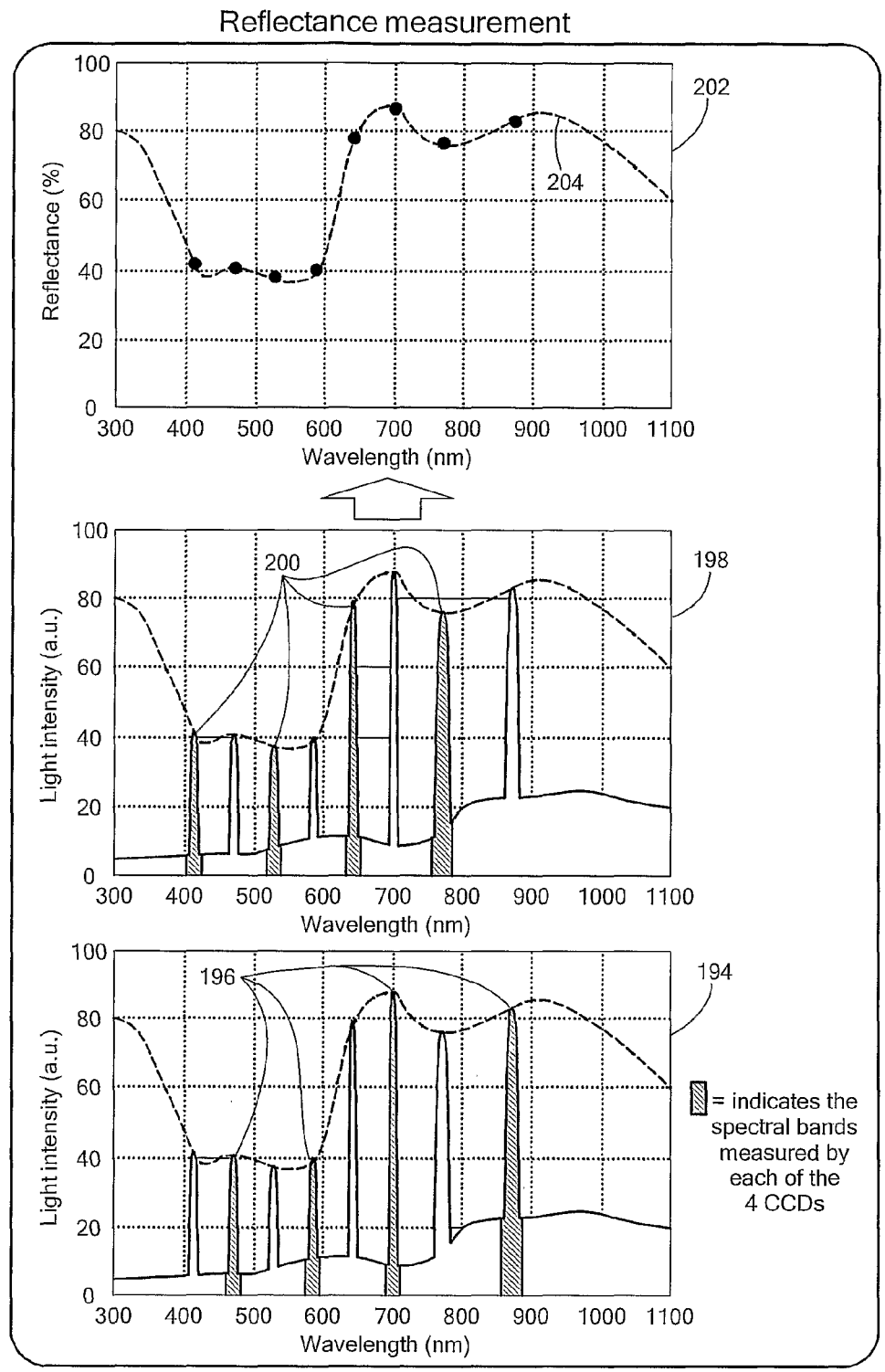
FIG. 7D is a set of three graph, a first graph (bottom) showing a spectrum associated with an image clone generated by the optical structure of FIG. 7, a second graph (middle) showing a spectrum associated with another image clone generated by the optical structure of FIG. 7, and a third graph (top) showing a combination of portions of the first two graphs.

Referring now to FIG. 7D, the graph 194 includes four spectral bands 196, aligned with four of the spectral bands 192 in the graph 190 generated by the multispectral light source. The four spectral bands 196 are indicative of spectral measurement associated with the image clone 182b (FIG. 7) and with the reflected light component 178a (FIG. 7).

The graph 198 includes four other spectral bands 200, aligned with four other of the spectral bands 192 in the graph 190 generated by the multispectral light source. The four spectral bands 200 are indicative of spectral measurement associated with the image clone 182a (FIG. 7) and with the reflected light component 178a (FIG. 7).

The graph 202 includes a curve 204 indicative of an envelope of the reflected light component 178a, which is similar to the curve 208 in the graph 206. The curve 204 can be generated from the amplitudes of the spectral bands 196, 200 measured in the graphs 194, 198, which align with the spectral bands 192 of the graph 190 transmitted by the multispectral light source. The curve 204 is indicative of a sum of the reflected light component 178a (FIG. 7) and the fluorescent light component 178c (FIG. 7).

Figure 7E:
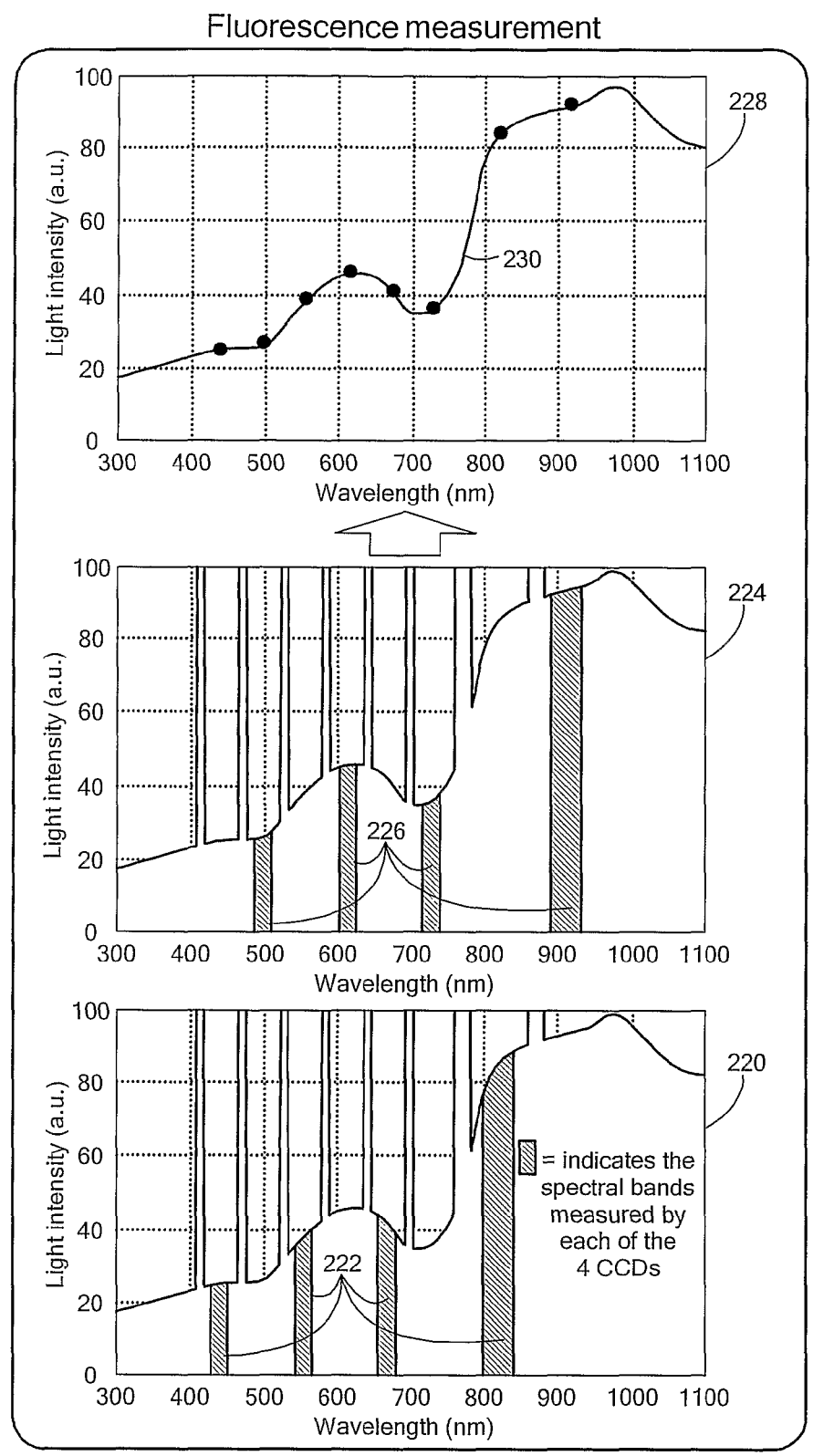
FIG. 7E is a set of three graphs, a first graph (bottom) showing a spectrum associated with yet another image clone generated by the optical structure of FIG. 7, a second graph (middle) showing a spectrum associated with yet another image clone generated by the optical structure of FIG. 7, and a third graph (top) showing a combination of portions of the first two graphs.

Referring now to FIG. 7E, the graph 220 includes four spectral bands 222, which are not aligned with any of the spectral bands 192 in the graph 190 generated by the multispectral light source. Because the four spectral bands 222 are not so aligned, then they do not correspond to any of the reflected light component 178a. Instead, the four spectral bands 222 are indicative of spectral measurements of only the fluorescent light component 178b (FIG. 7) in the image clone 182d (FIG. 7).

The graph 224 includes four other spectral bands 226, which also are not aligned with any of the spectral bands 192 in the graph 190 generated by the multispectral light source. Because the four spectral bands 226 are not so aligned, then they do not correspond to any of the reflected light component 178a. Instead, the four spectral bands 226 are indicative of spectral measurements of only the fluorescent light component 178b (FIG. 7) in the image clone 182c (FIG. 7).

The graph 228 includes a curve 230 indicative of an envelope of the fluorescent light component 178b, which is similar to the curve 212 in the graph 210 of FIG. 7B. The curve 230 can be generated from the amplitudes measured in the spectral bands 222, 226. Thus, by measuring the spectral bands 222, 226, which are not aligned with any of the spectral bands 192 in the graph 190 (FIG. 7A) generated by the multispectral light source, the fluorescent light spectrum can be measured, which occurs between the spectral bands 192 (FIG. 7A).

The curve 230 can be subtracted form the curve 204 to determine the reflected light component 178a (FIG. 7) in each of the spectral bands 196, 200 (FIG. 7D). Alternatively, if the reflected light component 178a (FIG. 7) is much larger than the fluorescent light component 178c (FIG. 7), then the reflected light component 178a can be ignored and the measured light in each of the spectral bands 196, 200 is representative of the reflected light component 178a.

Eight fluorescent spectral images can be generated with the above-described arrangement according to the measured spectral bands 222, 224 and eight reflected light spectral images can be generated according to the measured spectral bands 196, 200 (FIG. 7D), with or without subtraction of the fluorescent component 178*c* (FIG. 7), depending upon a relative magnitude of the reflected light component 178*a* (FIG. 7) versus the fluorescent light component 178*c* (FIG. 7).

While an optical structure 170 of FIG. 7 is shown having the four prisms 170*a*-170*d* to generate the four image clones 182*a*-182*d*, in other arrangements, an optical structure has more than four or fewer than four prisms to generate a corresponding more than four or fewer than four image clones. In one particular arrangement, an optical structure having five prisms and five corresponding image clones, in combination with five color optical filters and five different quad bandpass filters (QBPFs) can generate twenty spectral images simultaneously, some of which are aligned with spectral bands of the multispectral light source, and some of which are not, to provide both fluorescent light spectral images and reflected light spectral images. However, other arrangements are also possible having an optical structure with any number of prisms and a corresponding number of light paths (image clones).

While the optical structure 170 of FIG. 7 is shown to be comprised of the prisms 170*a*-170*d*, the splitting of the original image 186 into the plurality of images 182*a*-182*d* can be accomplished in a variety of others ways, including but not limited to, a plurality of partially reflecting mirrors and a plurality if focusing elements.

In some embodiments, the spectral bands of the fluorescent light (e.g., 222, 226 of FIG. 7E) are measured using the above-described multiple-bandpass optical filters (or polychroic mirrors) and related techniques. In some embodiments, the spectral bands of the narrowband reflected light (e.g., 196, 200, FIG. 7D) are also measured using the above-described multiple bandpass filters (or polychroic mirrors) and related techniques. However, in still other embodiments, the spectral bands of the narrowband reflected light are measured without using multiple bandpass filters (or polychroic mirrors), since the multispectral light source provides a similar function as described above in conjunction with FIG. 6A.

Application of the multispectral light source (see, e.g., FIG. 7A, top) is described in conjunction with particular optical structures used in particular multispectral imaging systems described above. However, it should be understood that, in other arrangements, the multispectral light source can be used with other optical structures used in other multispectral imaging systems, using computational techniques the same as or similar to those described above to achieve a plurality of spectral images.

Also, particular optical structures used in particular multispectral imaging systems described above achieve a plurality of fluorescent spectral images. However, it should be understood that, in other arrangements, other optical structures used in other multispectral imaging systems, using computational techniques the same as or similar to those described above to achieve a plurality of spectral images, can generate a plurality of fluorescent light spectral images of an object, in combination with, or not in combination with a plurality of reflected light spectral images of the object. For some arrangements, the fluorescent light is excited by a narrowband light source.

All references cited herein are hereby incorporated herein by reference in their entirety. Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. Apparatus for multispectral imaging, comprising:
  a multispectral light source adapted to transmit light toward an object, wherein the light is multispectral light having a plurality of discrete spectral bands;
  wherein the multispectral light source is tunable to achieve at one different discrete spectral band; and
  a multispectral imaging system adapted to receive reflected light from the object in accordance with the transmitted light, wherein the reflected light has the plurality of discrete passbands, wherein the multispectral imaging system comprises a processor adapted to identify an intensity of light in one or more of the discrete passbands.

2. A method of multispectral imaging, comprising:
  transmitting light toward an object, wherein the light is multispectral light having a plurality of discrete spectral bands;
  tuning the light to achieve at least one different discrete spectral band;
  receiving reflected light from the object in accordance with the transmitted light, wherein the reflected light has the plurality of discrete spectral bands; and
  processing the reflected light to identify an intensity of the reflected light in one or more of the discrete spectral bands.

3. Apparatus for multispectral imaging, comprising:
  a light source adapted to transmit multispectral light having at least two spectral bands toward an object, wherein the light source is adapted to excite emission of fluorescent light from the object; and
  a multispectral imaging system adapted to receive the light from the object, wherein the light comprises a fluorescent light component and a reflected light component in accordance with the transmitted light, wherein the multispectral imaging system is further adapted to identify an intensity of the fluorescent light component in at least one of the at least two spectral bands and to identify an intensity of the reflected light component in another different one or more of the at least two spectral bands.

4. The apparatus of claim 3, wherein the multispectral imaging system is further adapted to identify an intensity of the florescent light component in another different one or more spectral band which is not aligned with the at least two spectral bands.

5. A method of multispectral imaging, comprising: transmitting multispectral light having at least two spectral bands toward an object, wherein the light is adapted to excite emission of fluorescent light from the object; receiving light from the object wherein the light comprises a florescent light component and a reflected light component in accordance with the transmitted light; identifying an intensity of the fluorescent light component in at least one of the at least two spectral bands; and identifying an intensity of the reflected light component in another different one or more of the at least two spectral bands.

6. The method of claim 5, further including:
  identifying an intensity of the fluorescent light component in another different one or more spectral band which is not aligned with the at least two spectral bands.

* * * * *

UNITED STATES PATENT AND TRADEMARK OFFICE
CERTIFICATE OF CORRECTION

PATENT NO. : 8,416,414 B2
APPLICATION NO. : 13/296889
DATED : April 9, 2013
INVENTOR(S) : George Themelis It is certified that error appears in the above-identified patent and that said Letters Patent is hereby corrected as shown below:

In the Specifications

Column 15, Line 5, "174 or excitation" should be --174 for excitation--.

Column 18, Claim 1, Line 10, "at one" should be --at least one--.

Signed and Sealed this
Twenty-fifth Day of June, 2013

Teresa Stanek Rea
*Acting Director of the United States Patent and Trademark Office*